United States Patent [19]
Adeline

[11] 4,417,665
[45] Nov. 29, 1983

[54] MEANS FOR MOUNTING A CRANE ON A LOAD CARRYING PLATFORM

[76] Inventor: Joseph B. Adeline, 6 Hurlston Way, Koondoola, Australia

[21] Appl. No.: 289,412

[22] Filed: Aug. 3, 1981

[30] Foreign Application Priority Data

Oct. 30, 1980 [AU] Australia .................. 63873/80

[51] Int. Cl.³ .................................... B66C 7/02
[52] U.S. Cl. ................................... 212/224; 104/95; 105/154; 414/543
[58] Field of Search ............... 414/541–544; 212/182, 244, 254, 265, 224; 104/89, 95; 105/148, 154

[56] References Cited

U.S. PATENT DOCUMENTS 2,978,992  4/1961  Wason ............................ 105/154
3,031,091  4/1962  Erickson et al. .................. 414/544
3,784,035  1/1974  Dunbar ............................ 414/543

Primary Examiner—Robert G. Sheridan
Attorney, Agent, or Firm—Harness, Dickey & Pierce

[57] ABSTRACT

A mounting for a crane on a load carrying platform comprising a guide mounted on the underside of the platform and extending at least the full length of one side of the platform, a carriage mounted on said guide for movement therealong and having a portion projecting beyond the adjacent edge of the platform, said projecting portion being so dimensioned to enable the base of a crane to be mounted thereon so that the crane projects upwardly beyond the load carrying platform.

6 Claims, 4 Drawing Figures

MEANS FOR MOUNTING A CRANE ON A LOAD CARRYING PLATFORM

This invention relates to means for mounting a crane on a load carrying platform such as the tray of a motor vehicle or trailer.

The object of the invention is to provide means for mounting a crane on a load carrying platform so that the crane can be moved to a position in which it can be used to lift loads onto and off of the platform simply and expeditiously.

In one form the invention resides in means for mounting a crane on a load carrying platform comprising guide means mounted on the underside of the platform and extending at least the full length of one side of the platform, a carriage mounted on said guide means for movement therealong and having a portion projecting beyond the adjacent edge of the platform, said projecting portion being so dimensioned to enable the base of a crane to be mounted thereon so that the crane projects upwardly beyond the load carrying platform.

The invention will be better understood by reference to the following description of one specific embodiment thereof shown in the accompanying drawings wherein.

Figure 1:
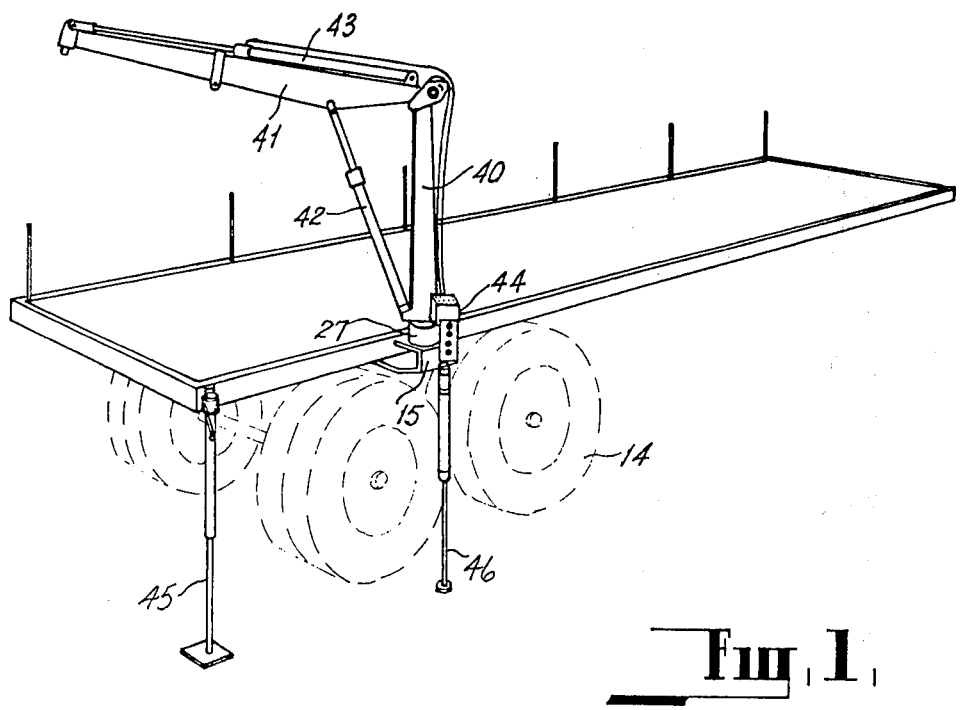
FIG. 1 is a perspective view of the tray of a semi trailer having a crane mounted thereon with the means of the present invention.

As shown in the drawings the guide means comprise a pair of spaced parallel rails 11 and 12 which are fixed to the underside of the tray 13 of the semi trailer, the rear end of the tray being supported on wheels 14 in the usual manner. In this embodiment the rails extend around the four sides of the tray, the corners being suitable radiused.

Figure 2:
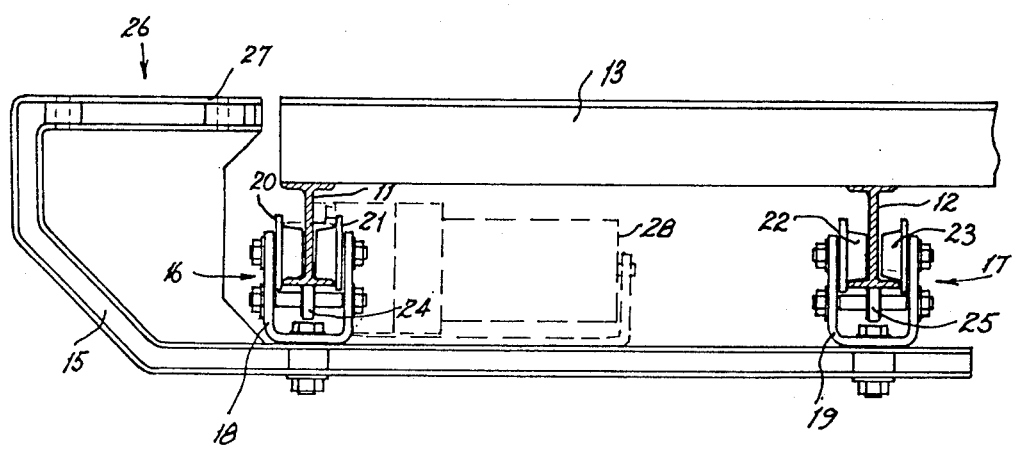
FIG. 2 is a sectional view showing the mounting of the carriage on the guide means on the underside of the tray.

A carriage 15 fabricated from suitable material is mounted on the rails 11 and 12 by means of two pairs of roller assemblies 16 and 17. Each assembly comprises a substantially U-shaped bracket 18, (19) carrying a pair of flanged rollers 20, 21 (22;23) and a lower roller 24 (25). The flanged rollers are disposed one on each side of the web of the associated rail and run on the lower flange thereof whilst the lower roller bears on the underside of the lower flange of the rail as is best seen in FIG. 2. The carriage is provided with an outwardly projecting portion 26 which projects beyond the edge of the tray and is provided with a return bend 27 which is coplanar with the top of the tray.

Figure 3:
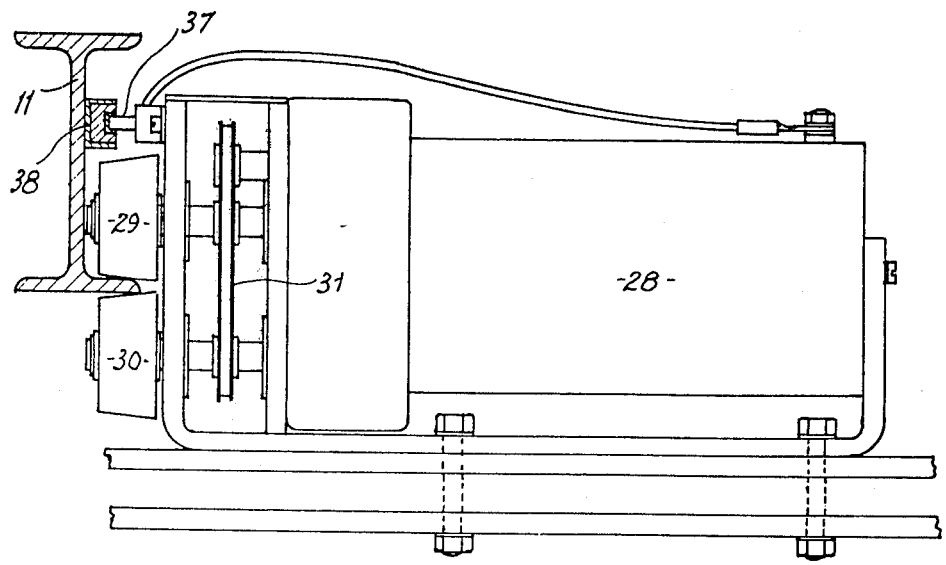
FIG. 3 is an enlarged fragmentary elevation showing the drive means.
Figure 4:
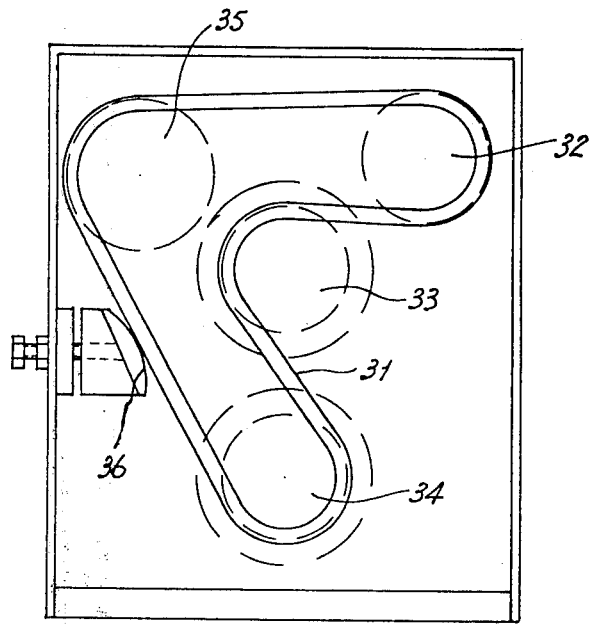
FIG. 4 is an end view showing the endless belt drive.

The carriage is driven by a small electric motor 28 mounted thereon and coupled to a pair of resilient rollers 29 and 30 disposed one above and one below the lower flange of the rail 11 as is best seen in FIG. 3 of the drawings. The drive is effected through an endless belt 31 passing around a pulley 32 on the drive shaft of the motor, pulleys 33 and 34 mounted on the shafts carrying the rollers 29 and 30 and an idler pulley 35 (see FIG. 4). An adjustable tensioning device 36 is provided to maintain the belt at the correct tension. Power is supplied to the motor through a brush or the like 37 engaging a channel shaped conductor 38 mounted on the rail 11.

As shown in FIG. 1 the base of a post 40 of the crane is mounted on the return bend 27 of the carriage so that the post projects upwardly. An extensible jib 41 is mounted on the upper end of the post in the conventional manner and is adapted to be raised or lowered by a hydraulic ram 42. The jib is extended or retracted by operation of a hydraulic ram 43. Both rams 42 and 43 are supplied with hydraulic fluid from a hydraulic power unit 44. Adjustable jacks 45 and 46 are provided to support the tray 13 and the carriage 15 during operation of the crane.

It will be appreciated that it is a simple matter to move the carriage 15 along the rails 11 and 12 to bring the crane to the most suitable position for placing a load on or removing a load from the tray 13.

I claim:

1. Means for mounting a crane on a load carrying platform comprising guide means mounted on the underside of the platform and extending at least the full length of one side of the platform, a carriage having a first portion mounted on said guide means for movement therealong and beneath said platform and having a cantilevered portion projecting beyond the adjacent edge of the platform, and a crane mounted on said cantilevered projecting portion and extending upwardly beyond the load carrying platform.

2. Means as claimed in claim 1 wherein the carriage cantilevered projecting portion has an upper part which is coplanar with the load carrying platform and which receives the base of the crane.

3. Means as claimed in claim 1 or 2 wherein the guide means extend around the four sides of the load carrying platform.

4. Means as claimed in claim 3 wherein the guide means comprise a pair of spaced rails and the carriage is provided with two assemblies of rollers, each assembly engaging a respective one of the rails.

5. Means as claimed in claim 4 wherein each assembly of rollers comprises a substantially U-shaped bracket carrying a pair of flanged rollers and a lower roller, the flanged rollers being disposed one on each side of the web of the associated rail and running on the lower flange thereof and the lower roller bearing on the underside of the flange.

6. Means as claimed in claim 5 provided with means for driving the carriage, said drive means comprising an electric motor mounted on the carriage and coupled to a pair of rollers engaging one of the rails.

* * * * *